United States Patent [19]

Kubánek et al.

[11] Patent Number: 4,755,590

[45] Date of Patent: Jul. 5, 1988

[54] METHOD FOR POSTPOLYMERIZATION OF POLYAMIDE GRANULES AFTER POLYMERIZATION IN MELT AND AN EQUIPMENT FOR PERFORMING THIS METHOD

[75] Inventors: Vladimír Kubánek, Prague; Zdenek Sterbácek, Ceské Budejovice; Jaroslav Králícek, Prague, all of Czechoslovakia

[73] Assignee: Ceskoslovenska akademie ved, Czechoslovakia

[21] Appl. No.: 928,973

[22] Filed: Nov. 10, 1986

[30] Foreign Application Priority Data

Nov. 11, 1985 [CS] Czechoslovakia ............... 8110-85

[51] Int. Cl.$^4$ ............................................. G08G 69/48
[52] U.S. Cl. .................................. 528/503; 422/135; 528/323
[58] Field of Search ............................ 528/503, 323

[56] References Cited

U.S. PATENT DOCUMENTS 3,480,596 11/1969 Simons ............................ 528/503

FOREIGN PATENT DOCUMENTS 614625 12/1948 United Kingdom .

OTHER PUBLICATIONS

English language translation of Czechoslovakian Pat. No. 218,359.

Primary Examiner—Harold D. Anderson
Attorney, Agent, or Firm—Leydig, Voit & Mayer

[57] ABSTRACT

The invention pertains to a method for postpolymerization of granules of polyamide based on $\epsilon$-caprolactam and formed by the anionic polymerization in melt and solves the problem of decreasing the content of low-molecular-weight substances in granules. At the same time, the invention pertains to an arrangement of equipment for performing the postpolymerization. The objective of the invention is a method for the continuous postpolymerization of polyamide based on $\epsilon$-caprolactam and formed by the anionic polymerization in melt, wherein the postpolymerization proceeds in two stages, while the granules are heated in the first stage to the required temperature of postpolymerization 160° to 200° C. for 5 to 30 minutes during their vertical transport and allowed at this temperature for 2 to 6 hours in the second stage without mechanical intervention at their gravitation transport which is assisted by vibrations or a reservoir.

An equipment for performing the method according to the invention which is formed by a two-stage unit consisting of a vertical vibration conveyer-heat exchanger and a reservoir, while the heat exchanger is provided with a heating jacket, a hopper in the lower part, and a heated overfall in the upper part, through which it is connected with the reservoir, while the reservoir is furnished outside with a jacket and a vibrator, inside with two plate heat-exchangers with the heating controlled by a temperature sensor, and in the lower part with a turnstile.

1 Claim, 1 Drawing Sheet

METHOD FOR POSTPOLYMERIZATION OF POLYAMIDE GRANULES AFTER POLYMERIZATION IN MELT AND AN EQUIPMENT FOR PERFORMING THIS METHOD

The invention pertains to a method for postpolymerization of granules of polyamide based on ε-caprolactam and formed by the anionic polymerization in melt and solves the problem of decreasing the content of low-molecular-weight substances in granules. At the same time, the invention pertains to the arrangement of equipment for performing the postpolymerization.

The method of continuous postpolymerization of granules of polyamide based on ε-caprolactam and prepared by the anionic polymerization which have been carried out so far (Czechoslovak Pat. No. 218,359) in a vibrofluidization trough at an incidental temperature gradient given by inlet temperature, on the one hand, and by heat loss, on the other, is not suitable with respect to the temperature regime of the process, which requires for all granules the residence time at least 4 hours at a constant temperature 160° to 200° C. (advantageously 190° C). The flow conditions attained in the vibrofluidization trough do not meet another requirement, that the residence time in the equipment for the heat postpolymerization should be for all granules as constant as possible. The result is an unsatisfactory quality of the product manifested in the distribution of the degree of polymerization, higher degree of polymerization and higher content of monomer than admits the standard (≦3% of low-molecular-weight substances).

The above mentioned shortcomings are avoided in the method for the continuous postpolymerization of polyamide based on ε-caprolactam and formed by the anionic polymerization in melt according to the invention, which consists in the post-polymerization carried out in two stages, while the granules are heated to the required temperature of postpolymerization 160° to 200° C. in the first stage during their vertical transport for 5 to 30 minutes, whereas the granules are allowed at this temperature for 2 to 6 hours in the second rest stage without mechanical intervention at their gravitation transport which is assisted by vibrations of a reservoir.

A part of the invention is an equipment for performing the method, which consists of a two-stage unit formed from a vertical vibration conveyer-heat exchanger and a reservoir. The vertical vibration conveyer-heat exchanger is insulated against heat loss by a heated jacket where a circulating heating medium flows through internal partitions. The heating jacket is made from at least two pieces for mechanical and operation reasons. The reservoir-silo is connected to the vibration conveyer-heat exchanger through a heated overfall and is provided with a vibrator and protected against heat loss by a jacket, through which flows a heating medium at temperature 180° to 200° C., and which may be inside equipped with two plate exchangers. The inlet of heating medium or heat is controlled automatically by a temperature sensor placed in a sensitive place inside granules. A turnstile is placed in the lower part of reservoir and controls the offtake of granules.

The reservoir (silo) may be furnished with chute-partitions with the automatically controlled heating instead of plate exchangers.

The reservoir (silo) may be provided with an efficient outer insulation without further heating with external medium.

In order to carry out the method according to the invention, these two-stage units can be ordered into an n-membered cascade, whre n = 1 to 7, while the volume of individual members of the cascade may be the same or diverse. The individual stages may advantageously operate at different temperatures.

The equipment according to the invention may comprise heating of the whole system with a controlled induction heating.

The method according to the invention solves all requirements of a successful postpolymerization, which failed so far to be technically realized, namely the efficient heating of fluidized material with the minimum desorption of low-molecular-weight substances, utilization of the vertical transport equipment for heating instead for the energetically disadvantageous cooling as it is in the recent equipment, securing of the constant residence time of particles, which is better than ≧90% of the nominal residence time, the prevailingly piston flow in the equipment, i.e. securing of the practically equal history for each particle in the postpolymerization equipment, a simple and efficient method of heat-loss prevention in the postpolymerization equipment, limitation of intense vibration only for the purpose of transport, and an improved efficacy of heat exchange.

The obtained product contains ≦3% of low-molecular-weight substances.

Two of possible ways of performance of the equipment for realization of the postpolymerization method according to the invention are diagrammatically shown in the appended drawings.

Figure 1:
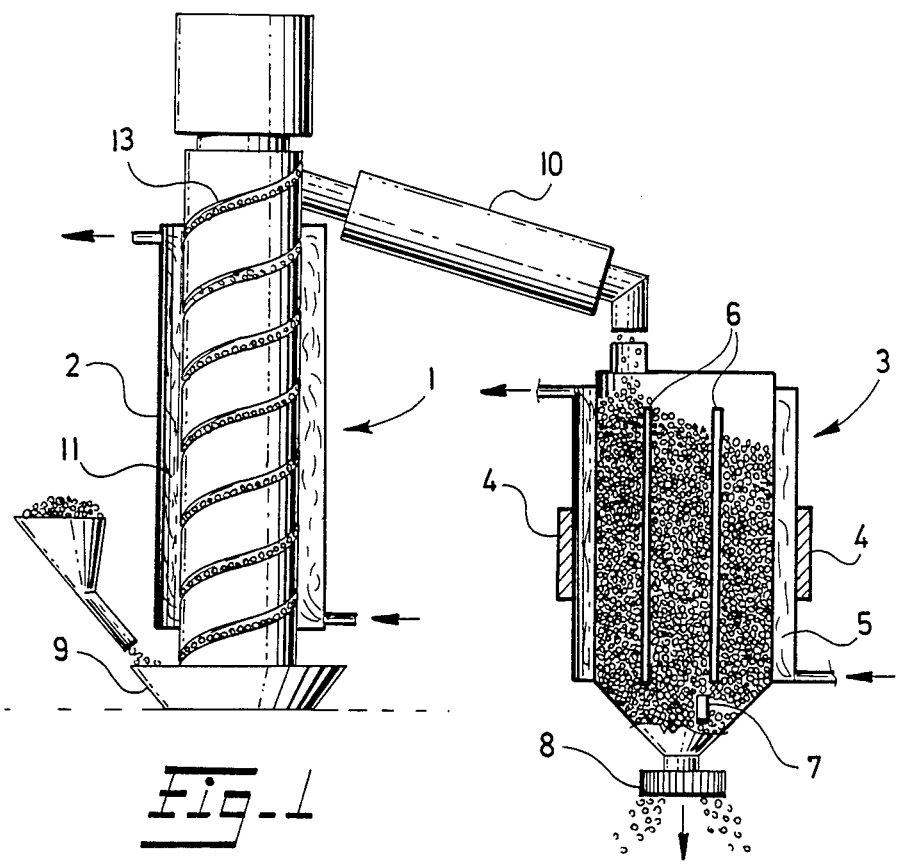
FIG. 1 shows the cross-sectional view of the equipment for the two-stage cascade with gravitation transport in the rest stage assisted by occasional vibrations.

The equipment according to the invention shown in FIG. 1 consists of a vertical vibration conveyer-heat exchanger 1 furnished with a charging hopper 9 and a heating jacket 2. The vertical conveyer-heat exchanger 1 is connected through a heated overfall 10 with a reservoir (silo) 3 which operates as a rest stage of the first member of cascade. The reservoir 3 is equipped with applied vibrators 4 and a jacket 5 and, inside, with two plate heat-exchangers 6 which are automatically controlled by a temperature sensor 7. A turnstile 8 controlling the offtake of granules is placed in the bottom of reservoir.

Figure 2:
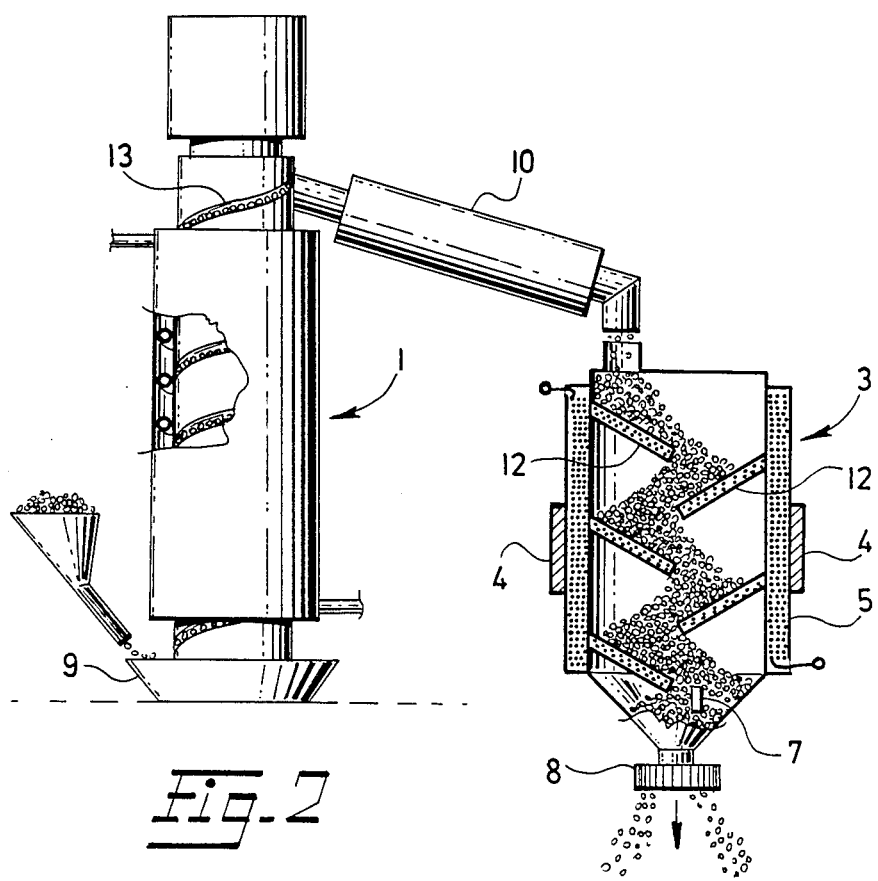
FIG. 2 shows the cross-sectional view, where the rest equipment operates with pouring the material along the inner partitions.

The equipment shown in FIG. 2 consists of a verticle vibration conveyer-heat exchanger 1 provided with a hopper 9 and a heating jacket 2 and connected through a heated hopper 10 with a reservoir 3 (silo) furnished inside the chute-partitions 12 having an automatically controlled heating 7, outside with a heating jacket 5 and a vibrator 4, and in the bottom with a turnstile 8 for the outlet of granules.

The method according to the invention is further illustrated in the given examples of performance which do not, however, limit the scope of the invention by any means.

EXAMPLE 1

The granules of polyamide, obtained by the anionic polymerization of ε-caprolactam above the melting temperature of the polyamide, fall from a cutting machine for the polymer sheet into a hopper of a vertical vibration conveyer-heat exchanger 1 (FIG. 1) at temperature 100° C. in the amount of 200 kg/h. The transport velocity of the conveyer-heat exchanger is set in such a way that the residence time of material in the transport is 15 minutes. The material is heated during this time by heat transfer from a jacketed slot 13 for transportation. The heating medium of temperature 200° C. flows through the jacket descendently and its through-flow is controlled by a temperature controller with a sensor placed in the head of the conveyer. The vertical vibration conveyer-heat exchanger is insulated against heat loss with a heated jacket 2, through which the circulating medium passes along the inner partitions 11. The heating jacket 2 is made from two pieces connected with bolts for mechanical and operation reasons.

The granules heated to 195° C. are continuously transferred through a heated overfall into a silo 3 which operates as a rest stage of the first member of a cascade. The silo 3 is provide with vibrators 4 and protected against the heat loss into atmosphere with a jacket 5 through which flows the circulating heating medium at temperature level 200° C. The silo is equipped with two plate heat-exchangers 6 which are automatically controlled according to the temperature sensor 7 in a sensitive place inside the granules. The residence time of granules inside the rest stage 3 is 2 hours. The offtake of a constant amount of granules 200 kg/h is controlled with a turnstile 8. The granules fall from the turnstile into a hopper of the next vertical vibration conveyer-heat exchanger 1a, where temperature is adapted to 166° C. The granules overfall through a heated hopper 10a into a silo 3a, which is mechanically performed similarly as the silo 3, and where the granules are kept at temperature 163°–169° C. for 3.5 hours. The granaules are dosed by a turnstile 8a into the following processing by regranulation or finishing or into storage silos. The process affords granules containing ≦1.5 wt. % of low-molecular-weight substances. The second member of cascade is not included into the drawing.

EXAMPLE 2

The granules fall in the amount of 200 kg/h from a discharging hopper of a granulation machine into a charging hopper of a vertical vibration conveyer-heat exchanger 1 (FIG. 2), which is heated in the surface of transportation path and a jacket 2 by induction heating automatically controlled with the blocked heating of the transfer surface above 210° C. The granules, which are heated at the top of the 5.5 m high conveyer-exchanger to 185° C., overfall into a silo 3 which is equipped with an automatic heating control of chute-partitions 12 and a jacket 5 by means of electric heating elements. The granules freely pour along the partitions with the occasional action of the applied vibrator 4 and leave the system through a turnstile 8 after the residence time of 1.5 hours. The material is poured from the rest stage 3 of the first member of cascade into the conveyer-heat exchanger 1a of the second member of cascade, where its temperature is adapted to 175° C. The granules overfall from this conveyer-exchanger and are transported by gravitation into the second pouring rest stage 3a where they remain at 172° to 177° C. for 2.5 hours. The realization of stage 3a is similar as of the member 3. After the mean residence time elapses, more than 90% of granules leave the silo through a turnstile 8a with the content of low-molecular-weight substances ≦3%.

We claim:

1. A method of postpolymerization of granules of polycaprolactam produced by melt anionic polymerization of caprolactam comprising (1) a first stage wherein the granules are heated at a temperature of about 160° C. to about 200° C. for about five to about thirty minutes during vertical transport of said granules, and (2) a second stage wherein the granules from (1) are heated at a temperature of about 160° C. to about 200° C. for about two to about six hours during gravitational transport of the granules with no mechanical intervention during said transport, which transport is assited by vibrations of a reservoir.

* * * * *